US012426068B2

(12) United States Patent
Dai et al.

(10) Patent No.: US 12,426,068 B2
(45) Date of Patent: Sep. 23, 2025

(54) METHOD AND APPARATUS FOR TRANSMISSION OF CONTROL SIGNALS

(71) Applicant: Lenovo (Beijing) Limited, Beijing (CN)

(72) Inventors: Mingzeng Dai, Shanghai (CN); Lianhai Wu, Beijing (CN); Haiming Wang, Beijing (CN); Congchi Zhang, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 365 days.

(21) Appl. No.: 18/030,966

(22) PCT Filed: Oct. 10, 2020

(86) PCT No.: PCT/CN2020/120158
§ 371 (c)(1),
(2) Date: Apr. 7, 2023

(87) PCT Pub. No.: WO2022/073226
PCT Pub. Date: Apr. 14, 2022

(65) Prior Publication Data
US 2023/0389048 A1 Nov. 30, 2023

(51) Int. Cl.
*H04W 72/30* (2023.01)
*H04L 5/00* (2006.01)
*H04W 72/231* (2023.01)

(52) U.S. Cl.
CPC ........... *H04W 72/30* (2023.01); *H04L 5/0053* (2013.01); *H04W 72/231* (2023.01)

(58) Field of Classification Search
CPC ..... H04W 72/30; H04W 72/231; H04W 4/06; H04W 76/40; H04W 88/085;
(Continued)

(56) References Cited

U.S. PATENT DOCUMENTS

2009/0219849 A1 9/2009 Alpert et al.
2018/0103437 A1 4/2018 Kommi et al.
(Continued)

FOREIGN PATENT DOCUMENTS

CN 109923916 A 6/2019
WO 2020002374 A1 1/2020

OTHER PUBLICATIONS

Lenovo, Motorola Mobility, "5G MBS Transmission Mode and Area Control", R3-204923, 3GPP TSG-RAN WG3 Meeting #109e Online, Aug. 17-28, 2020 (Year: 2020).*
(Continued)

*Primary Examiner* — Ayaz R Sheikh
*Assistant Examiner* — Tarell A Hampton
(74) *Attorney, Agent, or Firm* — FIG. 1 Patents

(57) ABSTRACT

The present disclosure relates to a method and apparatus for transmission of control signals. The method is performed by a NodeB including a central unit (CU) and a distributed unit (DU). The method comprises transmitting a first channel indication and a first data unit from the CU to the DU, the DU transmitting the multicast and broadcast services (MBS) configuration to user equipment (UE) over a first channel indicated by the first channel indication, the DU receiving a first completion indication from the UE, and transmitting the first completion indication from the DU to the CU. The first data unit includes a MBS configuration.

18 Claims, 9 Drawing Sheets

(58) Field of Classification Search
CPC .... H04W 92/12; H04L 5/0053; H04L 5/0044; H04L 5/0094; H04L 5/001
See application file for complete search history.

(56) References Cited

U.S. PATENT DOCUMENTS

| | | | |
|---|---|---|---|
| 2019/0150220 A1* | 5/2019 | Byun | H04W 76/11 370/329 |
| 2019/0222291 A1* | 7/2019 | Wang | H04B 7/005 |
| 2019/0387444 A1 | 12/2019 | Byun | |
| 2022/0345947 A1* | 10/2022 | Cao | H04W 4/06 |
| 2023/0072861 A1* | 3/2023 | Byun | H04L 1/08 |
| 2023/0140463 A1* | 5/2023 | Liu | H04W 4/06 370/229 |
| 2023/0284244 A1* | 9/2023 | Xu | H04W 72/51 370/312 |
| 2023/0292219 A1* | 9/2023 | Byun | H04W 40/246 |

OTHER PUBLICATIONS

LG Electronics, "Switching between multicast and unicast in RAN", R3-205253, 3GPP TSG-RAN WG3 #109-e Online, Aug. 17-28, 2020 (Year: 2020).*

PCT/CN2020/120158 , "International Preliminary Report on Patentability", PCT Application No. PCT/CN2020/120158, Apr. 20, 2023, 6 pages.

PCT/CN2020/120158 , "International Search Report and Written Opinion", PCT Application No. PCT/CN2020/120158, Feb. 24, 2023, 8 pages.

20956541.5 , "European Search Report", Application No. 20956541.5, May 8, 2024, 10 pages.

OPPO , "Discussion on MBS reception of idel or inactive mode UE", 3GPP TSG-RAN WG2 Meeting #111 electronic R2-2006801, 3rd Generation Partnership Project (3GPP), Mobile Competence Centre, Aug. 17, 2020, 4 pages.

* cited by examiner

METHOD AND APPARATUS FOR TRANSMISSION OF CONTROL SIGNALS

TECHNICAL FIELD

Embodiments of the present disclosure generally relate to wireless communication technology, especially to a method and apparatus for transmission of control signals.

BACKGROUND

The work item on new radio (NR) support of Multicast and Broadcast Services (MBS) was agreed in Release 17 (i.e., RP-201038). In the RAN3 #109e meeting, it was agreed to use existing Next-Generation Radio Access Network (NG-RAN) architecture to support NR MBS. In the existing NG-RAN architecture, the gNodeB (gNB) internal structure is split into two parts: gNB-Central Unit (CU) and gNB-Distributed Unit (DU). The two gNB units may focus on different layers. For a service (e.g., MBS), seamless and reliable signaling and transmission of control signals are highly beneficial.

SUMMARY OF THE APPLICATION

Some embodiments of the present disclosure at least provide a technical solution for multicast and broadcast services.

Some embodiments of the present disclosure provide a method performed by a NodeB. The NodeB may include a central unit (CU) and a distributed unit (DU). The method may include transmitting a first channel indication and a first data unit from the CU to the DU, transmitting, by the DU, the first data unit (in which the MBS configuration is included) to user equipment (UE) over a first channel indicated by the first channel indication, receiving, by the DU, a first completion indication from the UE, and transmitting the first completion indication from the DU to the CU. The first data unit may include a MBS configuration.

Some other embodiments of the present disclosure provide a method performed by a NodeB. The NodeB may include a central unit (CU) and a distributed unit (DU). The method may include generating a MBS configuration, transmitting, from the CU to the DU, a control channel information including the MBS configuration, and transmitting the MBS configuration to user equipment (UE) over a control channel.

Some embodiments of the present disclosure also provide an apparatus, including at least one non-transitory computer-readable medium having computer executable instructions stored therein, at least one receiver, at least one transmitter, and at least one processor coupled to the at least one non-transitory computer-readable medium, the at least one receiver, and the at least one transmitter. The computer executable instructions are programmed to implement any method as described, with the at least one receiver, the at least one transmitter, and the at least one processor.

Embodiments of the present disclosure provide a technical solution for multicast and broadcast services. Accordingly, embodiments of the present disclosure can provide superior signaling between the CU and the DU in a gNodeB (gNB) or between a UE and a gNB.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G New Radio (NR), 3GPP long-term evolution (LTE) Release 8 and so on. Persons skilled in the art know very well that, with the development of network architecture and new service scenarios, the embodiments in the present disclosure are also applicable to other similar technical problems.

Figure 1:
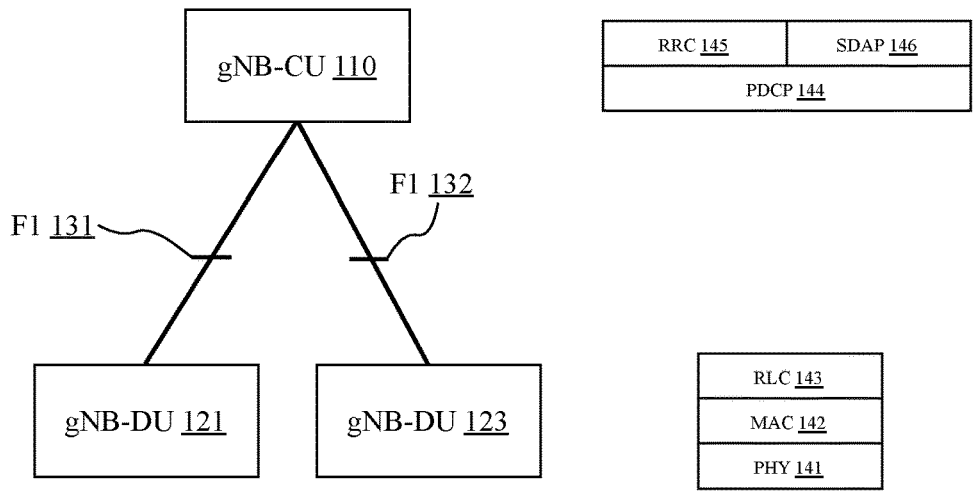
FIG. 1 is a schematic diagram illustrating an exemplary NodeB according to some embodiments of the present disclosure.

FIG. 1 is a schematic diagram illustrating an exemplary gNB 100 according to an embodiment of the present disclosure.

As shown in FIG. 1, a gNB 100 may include at least one gNB-Central Unit (gNB-CU) and at least one gNB-Distributed Unit (gNB-DU). The gNB 100 is compatible with any type of network capable of sending and receiving wireless communication signals. For example, the gNB 100 is compatible with wireless communication, cellular telephone, time division multiple access (TDMA)-based, code division multiple access (CDMA)-based, orthogonal frequency division multiple access (OFDMA)-based, LTE, 3GPP-based, 3GPP 5G NR, satellite communications, high altitude platform, and/or other communications networks. The gNB 100 may be referred to as a base station, base unit, base, access point, access terminal, macro cell, Node-B, enhanced Node B (eNB), Home Node-B, relay node, device, remote unit, or other terminology used in the art. A gNB may be distributed over a geographic region. Generally, a gNB is a part of a radio access network that may include one or more controllers communicably coupled to one or more corresponding base stations.

The gNB is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base stations may be communicably coupled to a mobility management entity (MME), a serving gateway (SGW), and/or a packet data network gateway (PGW). For example, one or more base stations may be communicably coupled to a Access and Mobility Management Function (AMF), a User Plane Function (UPF), and/or a Session Management Function (SMF) in 5G core network.

Embodiments of the present disclosure may be provided in a network architecture that adopts various service scenarios, for example but not limited to, 3GPP 3G, LTE, LTE-Advanced (LTE-A), 3GPP 4G, 3GPP 5G NR (new radio), 3GPP LTE Release 12 and onwards, etc. It is contemplated that along with 3GPP and related communication technology developments, the terminology recited in the present application may change, which should not affect the principle of the present application.

In particular, the gNB 100 may include one gNB-CU 110 and two gNB-DUs 121 and 123 for illustrative purposes. Although a specific number of gNB-CUs and gNB-DUs are depicted in FIG. 1, it is contemplated that any number of gNB-CUs and gNB-DUs may be included in the wireless communication system 10.

A core network may be coupled with the gNB 100. The core network may be a 5G Core Network interconnected between a wide area network (such as an Internet Protocol (IP) services network) and radio access network nodes (such as an eNB radio access network node, a 5G gNB radio access network node, and gNB 100). The core network may be one or more apparatuses or services between a wide area network and radio access network nodes.

In the existing NG-RAN architecture, the gNB internal structure is split into gNB-CU and gNB-DU, as shown in FIG. 1. The gNB-CU and gNB-DU may be connected by an interface F1. In FIG. 1, the gNB-CU 110 and gNB-DU 121 are connected by the interface F1 131 and gNB-CU 110 and gNB-DU 123 are connected by the interface F1 132. The gNB-CU 110 may be focused on the Radio Resource Control (RRC) layer 145, the Service Data Adaptation Protocol (SDAP) layer 146, and the Packet Data Convergence Protocol (PDCP) layer 144. The gNB-DU 121 or 123 may be focused on the Radio Link Control (RLC) layer 143, Media Access Control (MAC) layer 142, and Physical (PHY) layer 141.

In LTE Single Cell-Point to Multipoint (SC-PTM) service, in order to receive SC-PTM service, user equipment (UE) needs read system information, i.e. System Information Block (SIB) 20, to acquire Single Cell-Multicast Control Channel (SC-MCCH) configuration. The SC-MCCH configuration may include the SC-MCCH modification period, SC-MCCH repetition period and SC-MCCH subframe offset.

The wireless system (e.g., NR or LTE system) may provide SC-PTM configuration information on a logical channel, e.g., the SC-MCCH. Upon receipt of the SC-PTM configuration information on the SC-MCCH, the UE may know the list of all ongoing Multimedia Broadcast/Multicast Service (MBMS) sessions or MBS sessions transmitted on one or more Single Cell-Multicast Traffic Channels (SC-MTCHs). The UE may also know a Temporary Mobile Group Identity (TMGI), an optional session identifier (ID), the associated Group Radio Network Temporary Identity (G-RNTI) and scheduling information for each SC-PTM service. The SC-PTM configuration information may be transmitted via an RRC message (e.g., SCPTMConfiguration) in each SC-MCCH repetition period. When the control information on the SC-MCCH is changed, the UE may monitor whether a change notification is announced in a SC-MCCH modification period.

A NR system may include two signaling schemes in a control plane. At RRC_IDLE or RRC_INACTIVE state, a NR MBS may use LTE SC-PTM liked scheme. In some embodiments, at RRC_IDLE state or RRC_INACTIVE state, the service (e.g., 5G MBS) configuration information may be provided on a MCCH (Multicast Control Channel). At RRC_CONNECTED state, the service (e.g., 5G MBS) configuration information may be directly provided to UE through RRC dedicated signaling.

When 5G MBS configuration information is provided to a UE through a MCCH, the transmissions of the MCCH configuration parameters and the MCCH information between a gNB-CU and a gNB-DU may be critical.

If the NR MBS Configuration Information is transmitted to UE by dedicated RRC signaling, 5G MBS PTM configuration parameters may be transmitted between gNB-CU and gNB-DU, and gNB-DU may map resources of lower layers to corresponding radio bearer associated with UE. When 5G MBS configuration information is directly provided to UE through RRC dedicated signaling, transmission of the 5G MBS PTM configuration parameters between a gNB-CU and a gNB-DU may be critical. Furthermore, the mapping between the resources of the lower layer in charge of the gNB-DU and the radio bearer for the US may be similarly critical.

Figure 2:
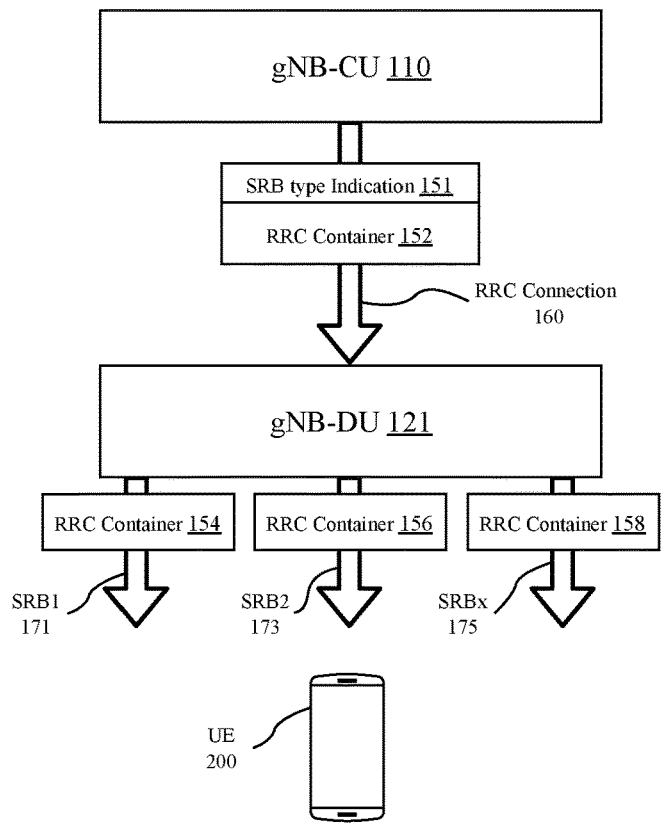
FIG. 2 is a schematic diagram illustrating exemplary communications according to some embodiments of the present disclosure.

FIG. 2 is a schematic diagram illustrating exemplary communications according to some embodiments of the present disclosure. FIG. 2 discloses transmissions of 5G MBS configuration information through a dedicated RRC message. FIG. 2 discloses that, in a RRC_CONNECTED state, the 5G MBS configuration information may be directly provided to a UE through RRC dedicated signaling.

FIG. 2 discloses that the 5G MBS configuration information may be transmitted to a UE over a dedicated Signaling Radio Bearer (SRB), and that the 5G MBS configuration information may be transmitted to a UE over a new SRB, which may be the Radio Bearers (RBs) used only for transmission of RRC messages or Non-Access Stratum (NAS) messages. For example, SRB0 is for RRC messages using a Common Control Channel (CCCH) logical channel; SRB1 is for RRC messages (which may include a piggybacked NAS message) as well as for NAS messages prior to the establishment of SRB2, all using a Dedicated Control Channel (DCCH) logical channel; and SRB2 is for RRC messages which include logged measurement information as well as for NAS messages, all using a DCCH logical channel.

In some embodiments of the present disclosure, a new type of SRB is defined. The new SRB of the present disclosure may be used for transmission of dedicated RRC messages which includes 5G MBS configuration information. For example, SRBx can be introduced for transmission of RRC messages which include 5G MBS configuration information, and the SRBx may be carried out by using DCCH or MCCH logical channels.

From FIG. 2, the RRC message may be encapsulated in a RRC container 152. The RRC container 152 may be transmitted in a RRC connection 160 over a F1 interface (e.g., F1-Application Protocol; F1-AP) between the gNB-CU 110 and the gNB-DU 121. A SRB type indication 151 is transmitted from the gNB-CU 110 to the gNB-DU 121. Through the SRB type indication 151, the gNB-CU 110 and gNB-DU 121 may identify the SRB type and map the RRC container to corresponding PDCP entity and RLC entity respectively. For the dedicated RRC of 5G MBS configuration, a new SRB type indication is used. For example, the SRB type indication 151 may be a SRBx type indication (e.g. SRBx ID) for transmission of the dedicated RRC of 5G MBS configuration.

From FIG. 2, the RRC container 154 may be transmitted over the SRB1 171 according to the corresponding SRB type indication. The RRC container 156 may be transmitted over the SRB2 173 according to the corresponding SRB type indication. The RRC container 158 may be transmitted over the SRBx 175 according to the corresponding SRB type indication.

Figure 3:
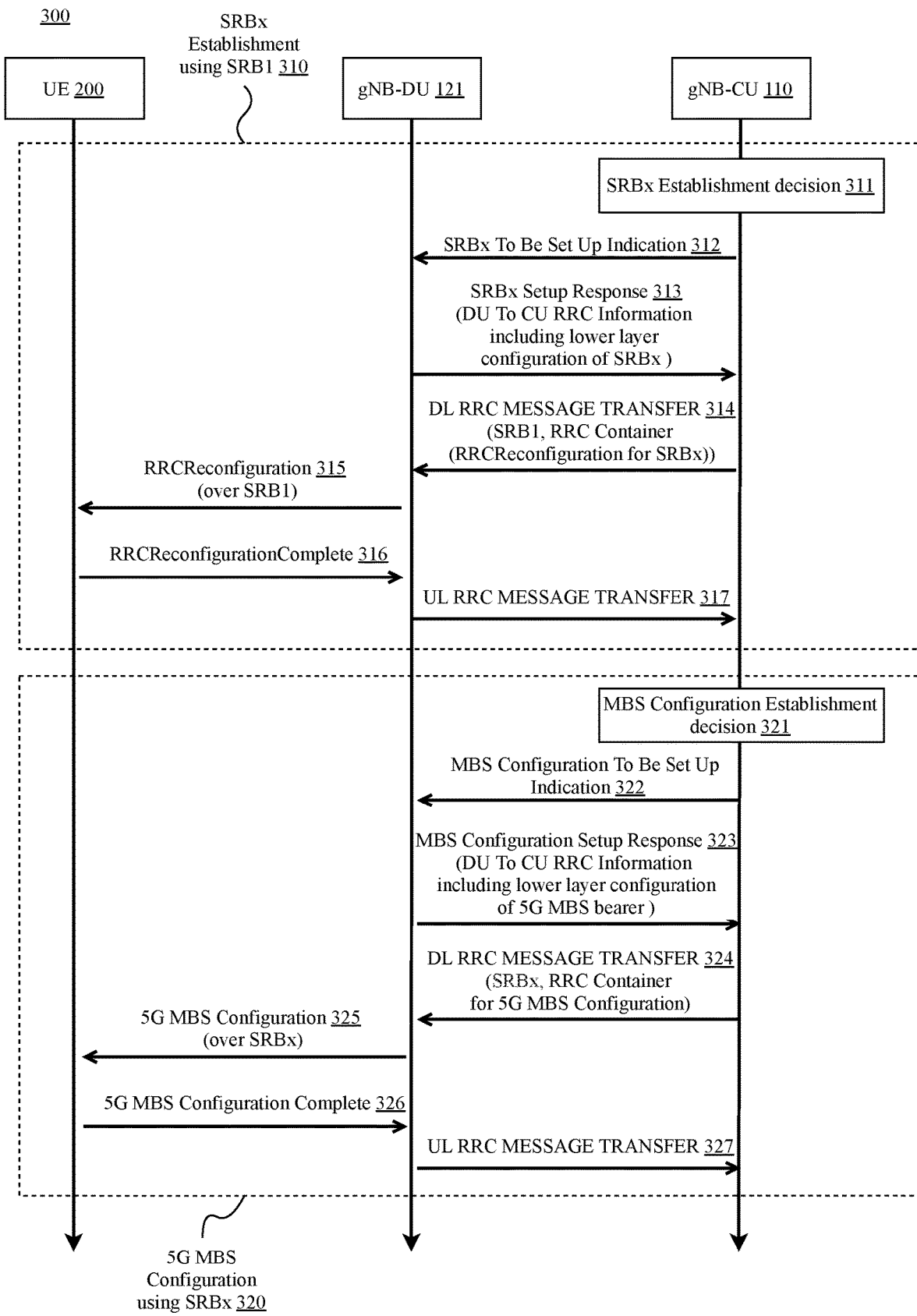
FIG. 3 is a flowchart of a method for signaling MBS configuration according to some embodiments of the present disclosure.

FIG. 3 is a flowchart of a method 300 for signaling MBS configuration according to some embodiments of the present disclosure. In FIG. 3, the 5G MBS configuration may be signaled through a dedicated RRC signaling scheme over a new SRB type. From FIG. 3, the signaling method may include two phases, e.g., a SRBx establishment phase 310 and a 5G MBS configuration phase 320. In the SRBx establishment phase 310, SRB1 may be used to establish SRBx. In 5G MBS configuration phase 320, SRBx may be used for MBS configuration.

The operations in SRBx establishment phase 310 are as follows. In operation 311, the gNB-CU 110 may determine or decide to Setup SRBx for transmission of 5G MBS configuration. In some embodiments, upon receipt of an MBS session start indication from core network, operation 311 may be performed by the gNB-CU 110. Upon receipt of an indication that a UE has joined a MBS session from core network, operation 311 may be performed by the gNB-CU 110. Upon receipt of an indication that a UE is interested in one or more MBS sessions from the UE, operation 311 may be performed by the gNB-CU 110.

In operation 312, the gNB-CU 110 may transmit a "SRBx To Be Setup Indication" to gNB-DU 121. The "SRBx To Be Setup Indication" indicates that a SRBx is going to be Setup. The "SRBx To Be Setup Indication" may be transmitted in a F1-AP message. The "SRBx To Be Setup Indication" may include a SRB ID to be Setup.

Upon receipt of the "SRBx To Be Setup Indication," the gNB-DU 121 may generate the configuration of low layers for the SRBx to be Setup (e.g., the related parameters in RLC layer, MAC layer, or PHY layer for the SRBx). In operation 313, the gNB-DU 121 may transmit a "SRBx Setup Response" to the gNB-CU 110. The "SRBx Setup Response" may include RRC information from the gNB-DU 121 to the gNB-CU 110. The "SRBx Setup Response" may include the configuration of low layers for the SRBx.

Upon receipt of the "SRBx Setup Response," the gNB-CU 110 may generate a "RRCReconfiguration" message. The "RRCReconfiguration" message may include SRBx configuration parameters (e.g., the configuration of low layers and the configuration of high layers). In operation 314, the gNB-CU 110 may transmit a RRC container together with a SRB type indication to the gNB-DU 121. The RRC container transmitted in operation 314 may include a "RRCReconfiguration" message. "RRCReconfiguration" message may be "RRCReconfiguration" for SRBx. In FIG. 3, a RRC container and a SRB type indication from the gNB-CU 110 to the gNB-DU 121 may be transmitted through an DL RRC Message Transfer procedure. In FIG. 3, a RRC container and a SRB type indication from the gNB-CU 110 to the gNB-DU 121 may be transmitted through an DL RRC Message Transfer procedure. In FIG. 3, the SRB type indication transmitted in operation 314 is SRB1, and the "RRCReconfiguration" message may be transmitted over SRB1 in the subsequent operation.

Upon receipt of the RRC container and SRB type indication, the gNB-DU 121 may transmit the "RRCReconfiguration" message to the UE 200 over the SRB indicated by the SRB type indication in operation 315. In operation 315 in FIG. 3, the gNB-DU 121 may transmit the "RRCReconfiguration" message to the UE 200 over SRB1.

Upon receipt of the "RRCReconfiguration" message, the UE 200 may Setup or configure the SRBx with the SRBx configuration parameters in the "RRCReconfiguration" message. Once the UE 200 completes setup of the SRBx, the UE 200 may transmit a completion indication to the gNB 100. In operation 316, the UE 200 may transmit an "RRCReconfigurationComplete" message to the gNB 100 or the gNB-DU 121. In operation 316, the "RRCReconfigurationComplete" message may be transmitted over SRB1 from the UE 200 to the gNB-DU 121 (or gNB 100).

Upon receipt of the "RRCReconfigurationComplete" message, the gNB-DU 121 may transmit or forward the same to the gNB-CU 110. In operation 317, the gNB-DU 121 may transmit or forward the "RRCReconfigurationComplete" message to the gNB-CU 110 through an UL RRC Message Transfer procedure. In operation 317, the message from the gNB-DU 121 to the gNB-CU 110 may include a SRB type indication. According to the embodiment of FIG. 3, the SRB type indication transmitted in the operation 317 may be SRB1.

The operations in 5G MBS configuration phase 320 are as follows.

In operation 321, the gNB-CU 110 may determine or decide to Setup 5G MBS configuration of one or more 5G MBS Sessions or Bearers. In some embodiments, upon receipt of an MBS session start indication from core network, the operation 321 may be performed by the gNB-CU 110.

In operation 322, the gNB-CU 110 may transmit an "MBS Configuration To Be Setup Indication" to the gNB-DU 121. The "MBS Configuration To Be Setup Indication" may be for one or more 5G MBS Sessions or Bearers. The "MBS Configuration To Be Setup Indication" may be transmitted in a F1-AP message.

Upon receipt of the "MBS Configuration To Be Setup Indication," the gNB-DU 121 may generate the configuration of low layers for the 5G MBS Session or Bearer to be Setup (e.g., the parameters in RLC layer, MAC layer, or PHY layer). In operation 323, the gNB-DU 121 may transmit an "MBS Configuration Setup Response" to the gNB-CU 110. The "MBS Configuration Setup Response" may include RRC information from the gNB DU 121 to the gNB-CU 110. The "MBS Configuration Setup Response" may include the configuration of low layers for the 5G MBS Sessions or Bearers.

Upon receipt of the "MBS Configuration Setup Response," the gNB-CU 110 may generate a "5G MBS Configuration" message. The "5G MBS Configuration" message may include 5G MBS Configuration parameters (e.g., the configuration of low layers and the configuration of high layers). In operation 324, the gNB-CU 110 may transmit a RRC container together with a SRB type indication to gNB-DU 121. The RRC container transmitted in operation 324 may include a "5G MBS configuration" message and related parameters. In FIG. 3, a RRC container and a SRB type indication from the gNB-CU 110 to gNB-DU 121 may be transmitted through a DL RRC Message Transfer procedure. In FIG. 3, the SRB type indication transmitted in operation 324 is SRBx, and the 5G MBS configuration may be transmitted over SRBx.

Upon receipt of the RRC container and SRB type indication, the gNB-DU 121 may transmit the "5G MBS Configuration" message to the UE 200 over the SRB indicated by the SRB type indication received by the gNG-DU 121. In operation 325 in FIG. 3, the gNB-DU 121 may transmit the "5G MBS Configuration" message to the UE 200 over SRBx.

Upon receipt of the "5G MBS Configuration" message, the UE 200 may setup or configure the related functions or services with the related parameters specified in the "5G MBS Configuration" message. Once the UE 200 completes setup of the functions or service related to the 5G MBS, the UE 200 may transmit a completion indication to the gNB 100. In operation 326, the UE 200 may transmit a "5G MBS Configuration Complete" message to the gNB 100 or the gNB-DU 121. In operation 326, the "5G MBS Configuration Complete" message may be transmitted over SRBx from the UE 200 to the gNB-DU 121 (or gNB 100).

Upon receipt of the "5G MBS Configuration Complete" message, the gNB-DU 121 may transmit or forward the same to the gNB-CU 110. In operation 327, the gNB-DU 121 may transmit or forward the "5G MBS Configuration Complete" message to the gNB-CU 110 through an UL RRC Message Transfer procedure. In operation 327, the message from the gNB-DU 121 to the gNB-CU 110 may include a SRB type indication. According to the embodiment of FIG. 3, the SRB type indication transmitted in the operation 327 may be SRBx.

In the scheme disclosed in FIGS. 2 and 3, a new SRB type (e.g., SRBx) is defined by a dedicated RRC message and used for 5G MBS configuration information. The gNB-CU 110 may transmit a RRC container together with a SRB type indication to gNB-DU 121, in which the RRC container may include a "5G MBS Configuration" message and related parameters and information. The "5G MBS Configuration" message may be transmitted by the gNB-DU 121 over a new SRB type (e.g., SRBx) indicated by the SRB type indication received by the gNB-DU 121. The scheme disclosed in FIGS. 2 and 3 may be provided at RRC_CONNECTED state.

Figure 4:
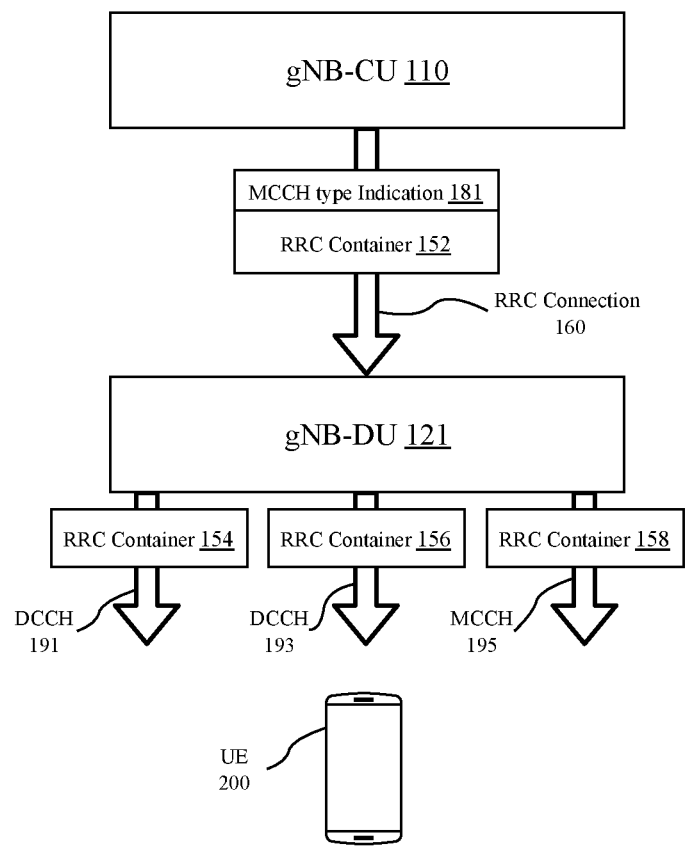
FIG. 4 is a schematic diagram illustrating exemplary communications according to some embodiments of the present disclosure.

FIG. 4 is a schematic diagram illustrating exemplary communications according to some embodiments of the present disclosure. Unlike the embodiments shown in FIGS. 2 and 3, the dedicated RRC container for the 5G MBS configuration information shown in FIG. 4 may be transmitted over a MCCH (Multicast Control Channel) rather than over a new SRB type. FIG. 4 discloses that the 5G MBS configuration information may be transmitted to a UE over a MCCH.

From FIG. 4, the RRC message may be encapsulated in a RRC container 152. The RRC container 152 may be transmitted in a RRC connection 160 over a F1 interface (e.g., F1-Application Protocol; F1-AP) between the gNB-CU 110 and the gNB-DU 121. A MCCH type indication 181 is transmitted from the gNB-CU 110 to the gNB-DU 121. Similar to the scheme shown in FIG. 2, the MCCH indicated by the MCCH type indication 181 may be used for a downlink RRC message transmission from gNB-CU 110 to gNB-DU 121 and may be used for an uplink downlink RRC message transmission from gNB-DU to gNB-CU. Through the MCCH type indication 181, the gNB-CU 110 and gNB-DU 121 may identify the MCCH and map the RRC container to corresponding PDCP entity and RLC entity respectively. For the dedicated RRC of 5G MBS configuration, a MCCH type indication 181 is used. For example, the MCCH type indication 181 may indicate a MCCH for transmission of the dedicated RRC of 5G MBS configuration. In some embodiments, the MCCH type indication may be implicitly indicated by the message name.

From FIG. 4, the RRC container 154 may be transmitted over the DCCH 191 according to a corresponding DCCH type indication. The RRC container 156 may be transmitted over the DCCH 193 according to a corresponding DCCH type indication. The RRC container 158 may be transmitted over the MCCH 193 according to a corresponding MCCH type indication.

Figure 5:
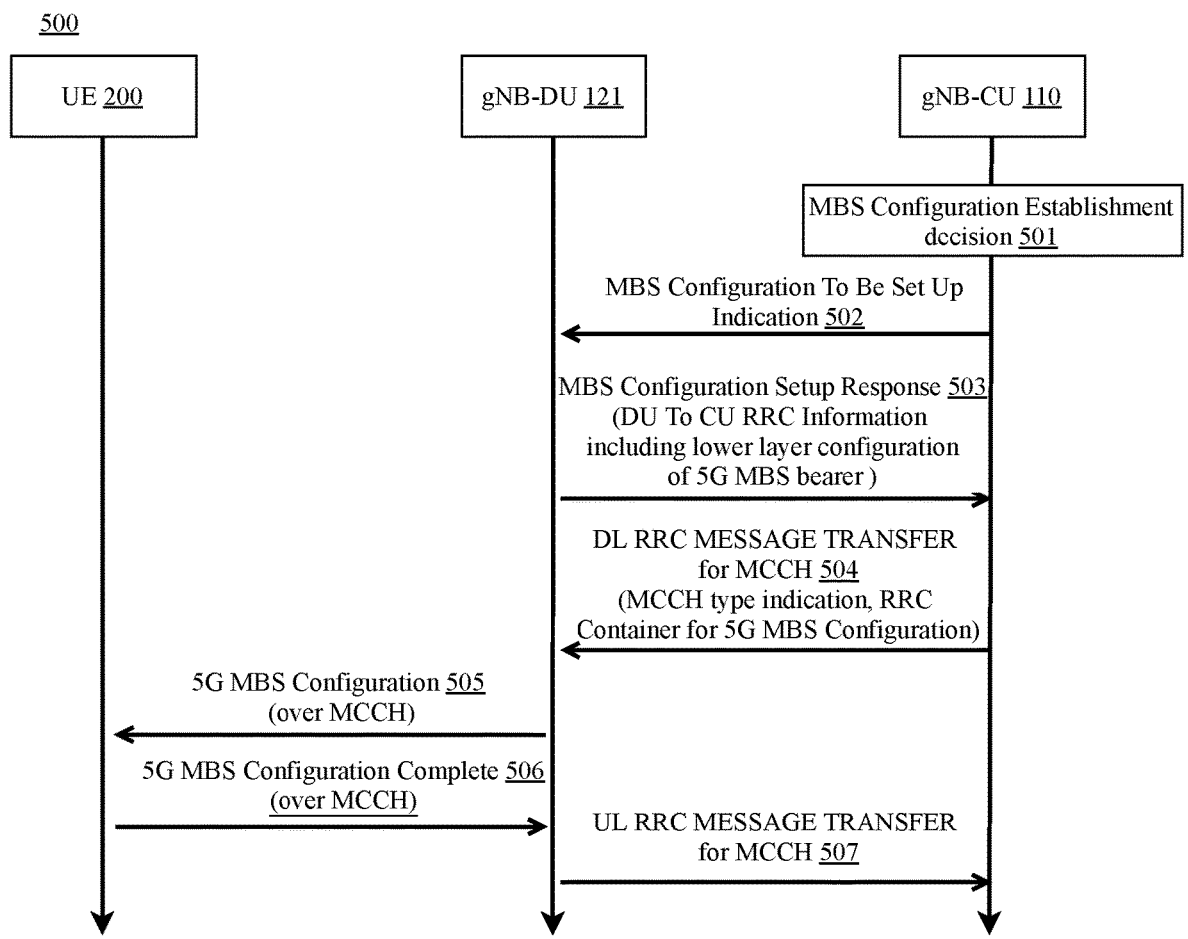
FIG. 5 is a flowchart of a method for signaling MBS configuration according to some embodiments of the present disclosure.

FIG. 5 is a flowchart of a method 500 for signaling MBS configuration according to some embodiments of the present disclosure. In FIG. 5, the 5G MBS configuration may be signaled through a dedicated RRC signaling scheme over a MCCH.

In operation 501, the gNB-CU 110 may determine or decide to setup 5G MBS configuration of one or more 5G MBS Sessions or Bearers. In some embodiments, upon receipt of an MBS session start indication from core network, the operation 501 may be performed by the gNB-CU 110.

In operation 502, the gNB-CU 110 may transmit an "MBS Configuration To Be Setup Indication" to the gNB-DU 121. The "MBS Configuration To Be Setup Indication" may be for one or more 5G MBS Sessions or Bearers. The "MBS Configuration To Be Setup Indication" may be transmitted in a F1-AP message.

Upon receipt of the "MBS Configuration To Be Setup Indication," the gNB-DU 121 may generate the configuration of low layers for the 5G MBS Session or Bearer to be Setup (e.g., the parameters in RLC layer, MAC layer, or PHY layer). In operation 503, the gNB-DU 121 may transmit an "MBS Configuration Setup Response" to the gNB-CU 110. The "MBS Configuration Setup Response" may include RRC information from the gNB-DU 121 to the gNB-CU 110. The "MBS Configuration Setup Response" may include the configuration of low layers for the 5G MBS Sessions or Bearers.

Upon receipt of the "MBS Configuration Setup Response," the gNB-CU 110 may generate a "5G MBS Configuration" message. The "5G MBS Configuration" message may include 5G MBS Configuration parameters (e.g., the configuration of low layers and the configuration of high layers). In operation 504, the gNB-CU 11—may transmit a RRC container together with a MCCH type indication to gNB-DU 121. The RRC container transmitted in operation 504 may include a "5G MBS configuration" message and related parameters. The MCCH type may be explicitly indicated by the message name or Information Entity (IE) name. In FIG. 5, a RRC container and a MCCH type indication from the gNB-CU 110 to gNB-DU 121 may be transmitted through an DL RRC Message Transfer procedure.

Upon receipt of the RRC container and MCCH type indication, the gNB-DU 121 may transmit the "5G MBS Configuration" message to the UE 200 over the MCCH indicated by the MCCH type indication received by the gNG-DU 121. In operation 505 in FIG. 5, the gNB-DU 121 may transmit the "5G MBS Configuration" message to the UE 200 over the MCCH.

Upon receipt of the "5G MBS Configuration" message, the UE 200 may setup or configure the related functions or services with the related parameters specified in the "5G MBS Configuration" message. Once the UE 200 completes setup of the functions or service related to the 5G MBS, the UE 200 may transmit a completion indication to the gNB 100. In operation 506, the UE 200 may transmit a "5G MBS Configuration Complete" message to the gNB 100 or the gNB-DU 121. In operation 506, the "5G MBS Configuration Complete" message may be transmitted over the MCCH from the UE 200 to the gNB-DU 121 (or gNB 100).

Upon receipt of the "5G MBS Configuration Complete" message, the gNB-DU 121 may transmit or forward the same to the gNB-CU 110. In operation 507, the gNB-DU 121 may transmit or forward the "5G MBS Configuration Complete" message to the gNB-CU 110 through an UL RRC Message Transfer procedure. In operation 507, the message from the gNB-DU 121 to the gNB-CU 110 may include a MCCH type indication (e.g., MCCH type indication 181).

In the scheme disclosed in FIGS. 4 and 5, a RRC message for 5G MBS Configuration Information is transmitted over a MCCH. The gNB-CU 110 may transmit a RRC container and MCCH type indication to gNB-DU 121, in which the RRC container may include a "5G MBS Configuration" message and related parameters and information. The gNB-DU 121 may transmit the "5G MBS Configuration" message to UE 200 over the MCCH indicated by the MCCH type indication. The scheme disclosed in FIGS. 4 and 5 may be provided at RRC_CONNECTED state.

Figure 6:
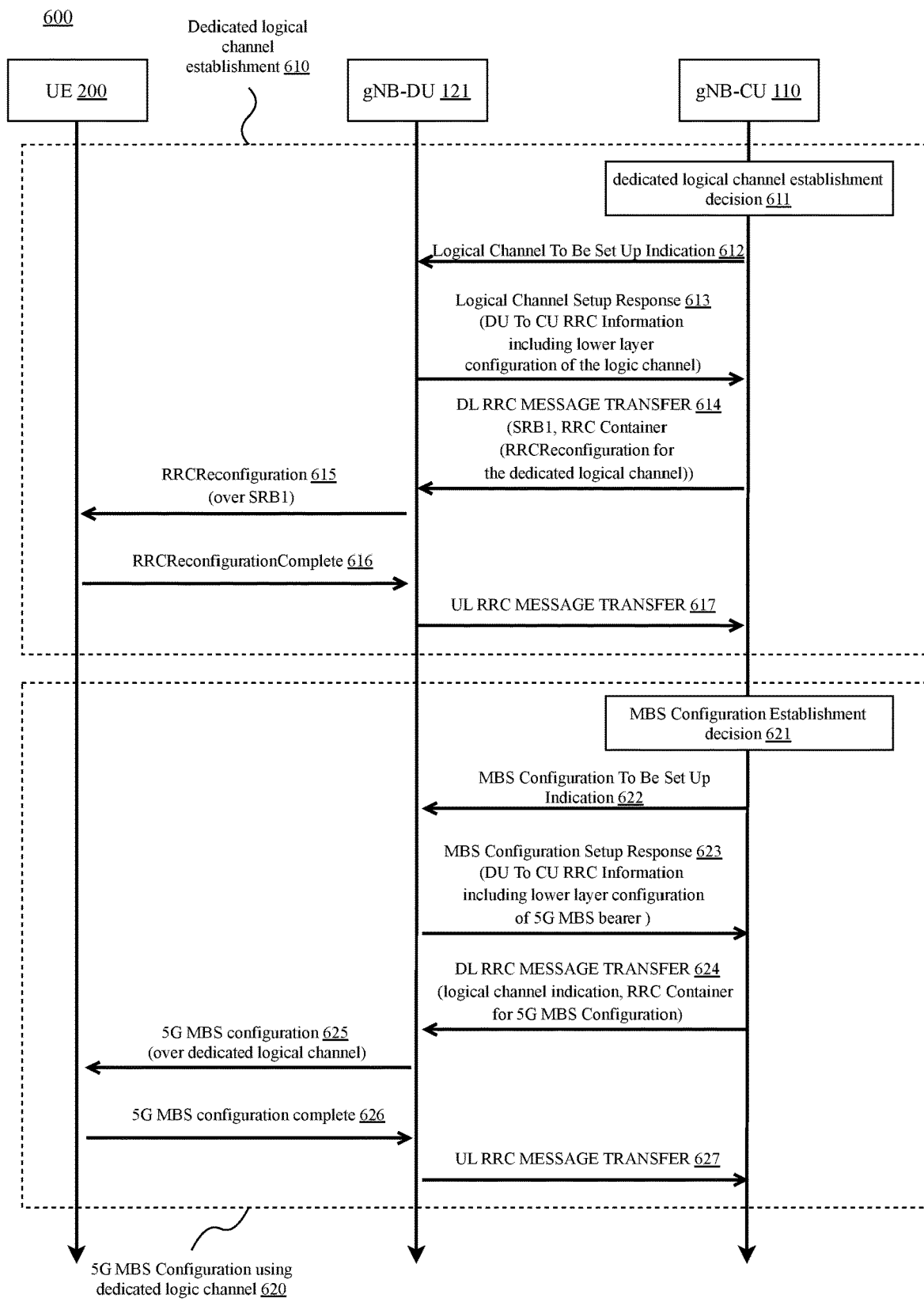
FIG. 6 is a flowchart of a method for signaling MBS configuration according to some embodiments of the present disclosure.

FIG. 6 is a flowchart of a method 600 for signaling MBS configuration according to some embodiments of the present disclosure. In FIG. 6, the 5G MBS configuration may be signaled through a dedicated RRC signaling scheme over a dedicated logical channel. From FIG. 6, the signaling method may include two phases, such as, for example, a dedicated logical channel establishment phase 610 and a 5G MBS configuration phase 620. In the dedicated logical channel establishment phase 610, SRB1, MCCH, or other logical channel may be used to establish SRBx. In 5G MBS configuration phase 620, the established logical channel may be used for MBS configuration.

The operations in the dedicated logical channel establishment phase 610 are as follows. In operation 611, the gNB-CU 110 may determine or decide to setup a dedicated logical channel for transmission of 5G MBS configuration. In some embodiments, upon receipt of an MBS session start indication from core network, the operation 611 may be performed by the gNB-CU 110. Upon receipt of an indication that a UE has joined in a MBS session from core network, the operation 611 may be performed by the gNB-CU 110. Upon receipt of an indication that a UE is interested in one or more MBS sessions from the UE, the operation 611 may be performed by the gNB-CU 110.

In operation 612, the gNB-CU 110 may transmit a "Logical channel To Be Setup Indication" to gNB-DU 121. The "Logical channel To Be Setup Indication" indicates that a dedicated logical channel is going to be setup. The "Logical channel To Be Setup Indication" may be transmitted in a F1-AP message. The "Logical channel To Be Setup Indication" may include a logical channel identifier (LCID) to be Setup. The "Logical channel To Be Setup Indication" may indicate a logical channel for 5G MBS control signaling is needed.

Upon receipt of the "Logical channel To Be Setup Indication," the gNB-DU 121 may generate the configuration of low layers for the logical channel to be setup (e.g., the related parameters in RLC layer, MAC layer, or PHY layer for the logical channel). In operation 613, the gNB-DU 121 may transmit a "Logical channel Setup Response" to the gNB-CU 110. The "Logical channel Setup Response" may include RRC information from the gNB-DU 121 to the gNB-CU 110. The "Logical channel Setup Response" may include the configuration of low layers for the logical channel. The gNB-DU 121 may allocate the LCID and transmit it to the gNB-CU 110 in the F1-AP message.

Upon receipt of the "Logical channel Setup Response," the gNB-CU 110 may generate a "RRCReconfiguration" message. The "RRCReconfiguration" message may include the configuration parameters of the dedicated logical channel to be setup (e.g., the configuration of low layers and the configuration of high layers). In operation 614, the gNB-CU 110 may transmit a RRC container together with a SRB type indication to the gNB-DU 121. The RRC container transmitted in operation 614 may include a "RRCReconfiguration" message, for the dedicated logical channel to be setup. In FIG. 6, a RRC container and a SRB type indication from the gNB-CU 110 to the gNB-DU 121 may be transmitted through an DL RRC Message Transfer procedure. In FIG. 6, the SRB type indication transmitted in operation 614 is SRB1, and the "RRCReconfiguration" message may be transmitted over SRB1 in the subsequent operation. In some embodiments, a RRC container and a MCCH type indication may be transmitted from the gNB-CU 110 to the gNB-DU 121 in operation 614, and the "RRCReconfiguration" message may be transmitted over a MCCH in the subsequent operation. In other embodiments, a RRC container and a logical channel type indication may be transmitted from the gNB-CU 110 to the gNB-DU 121 in operation 614, and the "RRCReconfiguration" message may be transmitted over another logical channel in the subsequent operation.

Upon receipt of the RRC container and SRB type indication, the gNB-DU 121 may transmit the "RRCReconfiguration" message to the UE 200 over the SRB indicated by the SRB type indication in operation 315. In operation 315 in FIG. 6, the gNB-DU 121 may transmit the "RRCReconfiguration" message to the UE 200 over SRB1. In some embodiments, the "RRCReconfiguration" message may be transmitted over a MCCH in operation 615 based on the MCCH type indication transmitted in operation 614. In other embodiments, the "RRCReconfiguration" message may be transmitted over another logical channel in operation 615 based on the logical channel type indication transmitted in operation 614.

Upon receipt of the "RRCReconfiguration" message, the UE 200 may setup or configure the dedicated logical channel with the configuration parameters in the "RRCReconfiguration" message. Once the UE 200 completes setup of the dedicated logical channel, the UE 200 may transmit a completion indication to the gNB 100. In operation 616, the UE 200 may transmit an "RRCReconfigurationComplete" message to the gNB 100 or the gNB-DU 121. In operation 616, the "RRCReconfigurationComplete" message may be transmitted over SRB1 from the UE 200 to the gNB-DU 121 (or gNB 100). In some embodiments, the "RRCReconfigurationComplete" message may be transmitted over a MCCH in operation 616. In other embodiments, the "RRCReconfigurationComplete" message may be transmitted over another logical channel in operation 616.

Upon receipt of the "RRCReconfigurationComplete" message, the gNB-DU 121 may transmit or forward the same to the gNB-CU 110. In operation 617, the gNB-DU 121 may transmit or forward the "RRCReconfigurationComplete" message to the gNB-CU 110 through an UL RRC Message Transfer procedure.

The operations in 5G MBS configuration phase 620 are as follows.

In operation 621, the gNB-CU 110 may determine or decide to setup 5G MBS configuration of one or more 5G MBS Sessions or Bearers. In some embodiments, upon receipt of an MBS session start indication from core network, the operation 621 may be performed by the gNB-CU 110.

In operation 622, the gNB-CU 110 may transmit an "MBS Configuration To Be Setup Indication" to the gNB-DU 121. The "MBS Configuration To Be Setup Indication" may be for one or more 5G MBS Sessions or Bearers. The "MBS Configuration To Be Setup Indication" may be transmitted in a F1-AP message.

Upon receipt of the "MBS Configuration To Be Setup Indication," the gNB-DU 121 may generate the configuration of low layers for the 5G MBS Session or Bearer to be setup (e.g., the parameters in RLC layer, MAC layer, or PHY layer). In operation 623, the gNB-DU 121 may transmit an "MBS Configuration Setup Response" to the gNB-CU 110. The "MBS Configuration Setup Response" may include RRC information from gNB-CU 110 to gNB-DU 121. The "MBS Configuration Setup Response" may include the configuration of low layers for the 5G MBS Sessions or Bearers.

Upon receipt of the "MBS Configuration Setup Response," the gNB-CU 110 may generate a "5G MBS Configuration" message. The "5G MBS Configuration" message may include 5G MBS Configuration parameters (e.g., the configuration of low layers and the configuration of high layers). In operation 624, the gNB-CU 110 may transmit a RRC container together with a logical channel indication to gNB-DU 121. The RRC container transmitted in operation 324 may include a "5G MBS configuration" message and related parameters. In FIG. 6, a RRC container and a logical channel indication from the gNB-CU 110 to gNB-DU 121 may be transmitted through a DL RRC Message Transfer procedure. In FIG. 6, the logical channel indication transmitted in operation 624 indicates the dedicated logical channel established in the dedicated logical channel establishment phase 610, and the 5G MBS configuration may be transmitted over the dedicated logical channel.

Upon receipt of the RRC container and logical channel indication, the gNB-DU 121 may transmit the "5G MBS Configuration" message to the UE 200 over the dedicated logical channel indicated by the logical channel indication received by the gNG-DU 121. In operation 625 as shown in FIG. 6, the gNB-DU 121 may transmit the "5G MBS Configuration" message to the UE 200 over the dedicated logical channel.

Upon receipt of the "5G MBS Configuration" message, the UE 200 may setup or configure the related functions or services with the related parameters specified in the "5G MBS Configuration" message. Once the UE 200 completes setup of the functions or service related to the 5G MBS, the UE 200 may transmit a completion indication to the gNB 100. In operation 626, the UE 200 may transmit an "5G MBS Configuration Complete" message to the gNB 100 or the gNB-DU 121. In operation 626, the "5G MBS Configuration Complete" message may be transmitted over the dedicated logical channel from the UE 200 to the gNB-DU 121 (or gNB 100).

Upon receipt of the "5G MBS Configuration Complete" message, the gNB-DU 121 may transmit or forward the same to the gNB-CU 110. In operation 327, the gNB-DU 121 may transmit or forward the "5G MBS Configuration Complete" message to the gNB-CU 110 through an UL RRC Message Transfer procedure.

In the scheme disclosed in FIG. 6, a dedicated RRC of 5G MBS Configuration Information is transmitted over a specific logical channel. The gNB-DU 121 may allocate the corresponding Logical channel Identifier (LCID) and transmit the same to gNB-CU 110. The gNB-CU 110 may transmit a RRC container and the logical channel ID to the gNB-DU 121, in which the RRC container may include a "5G MBS Configuration" message and related parameters and information. The gNB-DU 121 may transmit the "5G MBS Configuration" message to UE 200 over the indicated logical channel. The scheme disclosed in FIG. 6 may be provided at RRC_CONNECTED state.

As mentioned above, the schemes disclosed in FIGS. 2-6 relate to transmission of 5G MBS configuration information through a dedicated RRC message at RRC_CONNECTED state. That is, the 5G MBS configuration information may be provided to a UE by RRC dedicated signaling directly. However, at RRC_IDLE state or RRC_INACTIVE state, a different scheme is required for transmission of 5G MBS configuration information.

Similar to LTE SC-PTM, 5G MBS introduces two new logical channels for broadcasting data and control information, the Multicast Control Channel (MCCH) and the Multicast Traffic Transport Channel (MTCH). The MCCH may carry the information and configuration for different services. For example, the MCCH may transmit a "5G MBS PTM Configuration" message. The "5G MBS PTM Configuration" message may indicate the active 5G MBS sessions and the scheduling information for each session or bearer (e.g., scheduling period, scheduling window, and start offset). The information carried by MCCH may be transmitted periodically with a configurable repetition period. The user data of a 5G MBS may carried by the MTCH (e.g., a logical channel). Usually, the configuration of the MCCH may be provided in the system information. The configuration of a MCCH may include the MCCH modification period, the MCCH repetition period, and the MCCH subframe offset.

The information carried on a MCCH may be changed or updated at specific radio frames. That is, the concept of a modification period is applied on a MCCH. Within a modification period, the same information may be transmitted on the MCCH several times. The times the information is transmitted on the MCCH within a modification period may be defined by its scheduling. For example, the times the information is transmitted on the MCCH within a modification period may be based on a repetition period. When the network (e.g., the core network) changes or updates (some) information carried on the MCCH, the network may notify the UEs about the change or update during a first modification period. In the next modification period, the network may transmit the changed or updated information on the MCCH.

Figure 7:
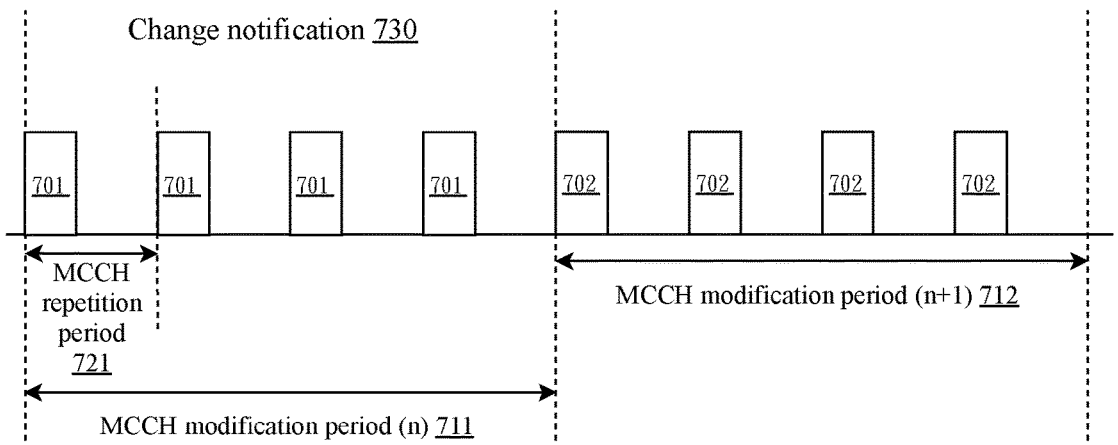
FIG. 7 is a schematic diagram illustrating an exemplary control channel according to some embodiments of the present disclosure.

FIG. 7 is a schematic diagram illustrating an exemplary control channel according to some embodiments of the present disclosure. Operations of a MCCH may be explained with reference of FIG. 7. Information 701 may be transmitted or carried on the MCCH. Information 701 may be transmitted or repeated several times within a MCCH modification period. For example, information 701 can be transmitted or repeated four times within the MCCH modification period (n) 711. The times that the information 701 is transmitted or repeated within a MCCH modification period may be defined by the length of the MCCH modification period and the length of the MCCH repetition period. For example, because the length of the MCCH modification period (n) 711 is four times that of the MCCH repetition period 721, the information may be transmitted or repeated four times within the MCCH modification period (n) 711.

In the MCCH modification period (n) 711, the network transmits or broadcasts a change notification (or an update notification) 730. In the next modification period (i.e., the MCCH modification period (n+1) 712, the changed information (or the updated information) 702 is transmitted on the MCCH. Since the length of the MCCH modification period and the length of the MCCH repetition period are unchanged, the information 702 may be transmitted or repeated four times on the MCCH.

Figure 8:
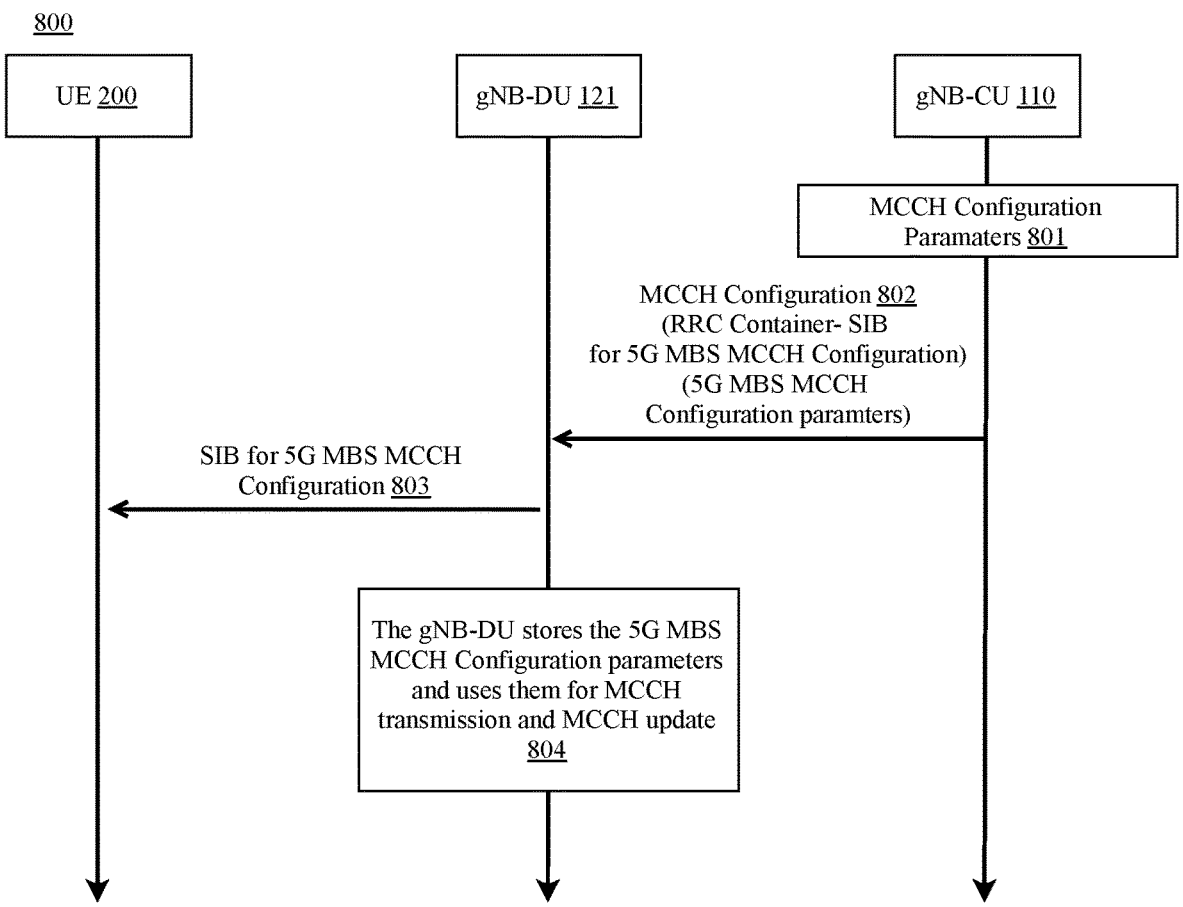
FIG. 8 is a flowchart of a method for signaling Multicast Control Channel (MCCH) configuration according to some embodiments of the present disclosure.

FIG. 8 is a flowchart of a method 800 for signaling Multicast Control Channel (MCCH) configuration according to some embodiments of the present disclosure. In some embodiments, the MCCH configuration may be provided in the system information. The MCCH configuration may include the MCCH modification period, the MCCH repetition period, and the MCCH subframe offset. A UE may receive the MCCH Information through the MCCH configuration.

Referring to FIG. 8, parameters of a MCCH configuration (e.g., the MCCH modification period, the MCCH repetition period, and the MCCH subframe offset) may be determined or decided by the gNB-CU 110. In operation 801, the gNB-CU 110 determines the parameters of a MCCH configuration.

When the gNB-CU 110 determines or decides to start a MBS service, the gNB-CU 110 may generate the System Information Block for broadcasting the MCCH configuration. The gNB-CU 110 may transmit a RRC container to the UE 200 via gNB-DU 121, in which the RRC container is for the generated SIB. In operation 802, the gNB-CU 110 may transmit a RRC container to the gNB-DU 121, in which the RCC container from the gNB-CU 110 to the gNB-DU 121 is used to transmit the SIB, and the SIB is used to broadcast the parameters of a 5G MBS MCCH configuration.

In operation 803, the gNB-DU 121 may transmit the SIB for the 5G MBS MCCH configuration to the UE 200. The gNB-DU 121 may broadcast the SIB for the 5G MBS MCCH configuration to the UE 200.

The gNB-CU 110 may also provide the parameters of the MCCH configuration to the gNB-DU 121 for updating the MCCH information. In operation 804, the gNB-DU 121 may store the parameters of the 5G MBS MCCH configuration and use the parameters for updating the MCCH information.

In the scheme shown in FIG. 8, the gNB-CU 110 may determine or decide the parameters of the MCCH configuration. The gNB-CU 110 may transmit the SIB of MCCH configuration to UE 200 via gNB-DU 121. The gNB-CU 110 may also transmit the parameters of the MCCH configuration to gNB-DU 121 so that gNB-DU 121 may store the parameters and use them for MCCH related transmissions or functions. The scheme disclosed in FIG. 8 may be provided at RRC_IDLE state or RRC_INACTIVE state.

Figure 9:
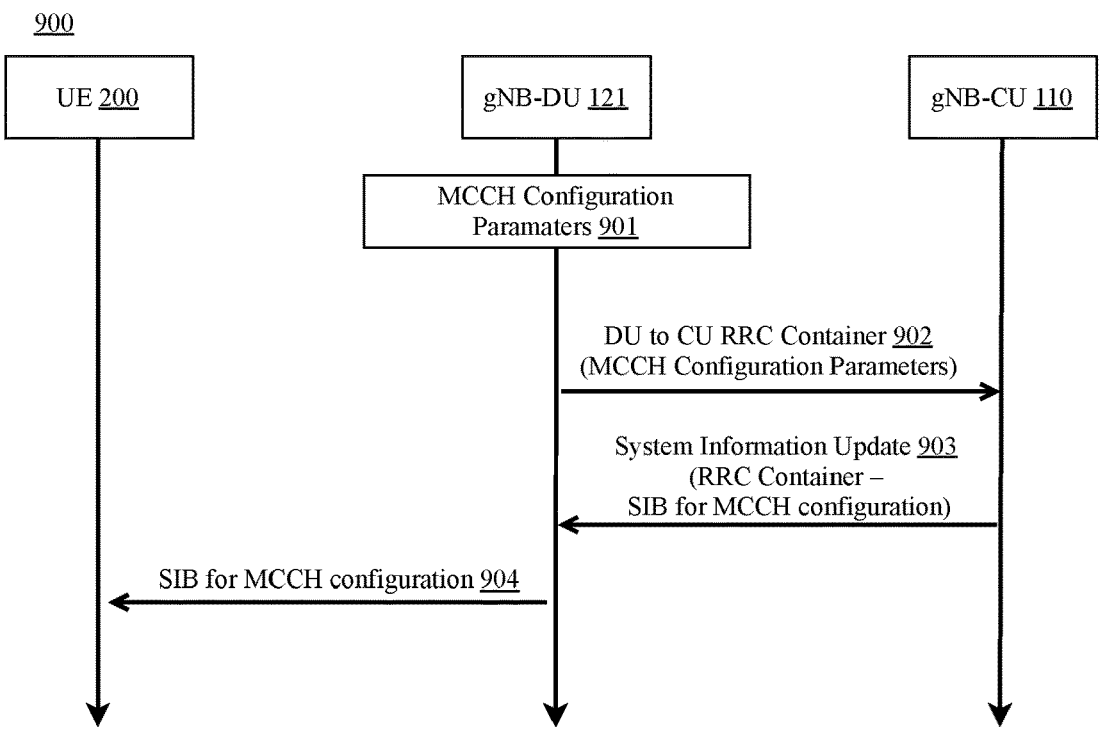
FIG. 9 is a flowchart of a method for signaling MCCH configuration according to some embodiments of the present disclosure.

FIG. 9 is a flowchart of a method 900 for signaling MCCH configuration according to some embodiments of the present disclosure. Referring to FIG. 9, some or all parameters of the MCCH configuration parameters (e.g., the MCCH modification period, the MCCH repetition period, and the MCCH subframe offset) may be determined or decided by the gNB-DU 121. In operation 901, the gNB-DU 121 determines parameters of a MCCH configuration.

The gNB-DU may transmit the parameters of the MCCH configuration to gNB-CU 110. In operation 902, the parameters determined by the gNB-DU 121 may be transmitted to the gNB-CU 110 with a RRC container 902.

Upon receipt of the parameter for the gNB-DU 121, the gNB-CU 110 may generate the SIB for broadcasting the MCCH configuration. The gNB-CU 110 may transmit a RRC container to the UE 200 via gNB-DU 121, for the generated SIB. In operation 903, the gNB-CU 110 may transmit a RRC container to the gNB-DU 121, in which the RCC container from the gNB-CU 110 to the gNB-DU 121 is used to transmit the SIB, and the SIB is used to broadcast the parameters of the MCCH configuration.

In operation 904, the gNB-DU 121 may transmit the SIB for the MCCH configuration to the UE 200. The gNB-DU 121 may broadcast the SIB for the MCCH configuration to the UE 200.

In some embodiments of the method 900, parameters of the MCCH configuration may be generated by the gNB-DU 121, and the SIB for broadcasting the MCCH configuration may be generated by the gNB-DU 121 as well. The gNB 100 (e.g., gNB-DU 121) may transmit the SIB to UE 200 directly. The scheme disclosed in FIG. 9 may be provided at RRC_IDLE state or RRC_INACTIVE state.

The information carried on the MCCH may include a "5G MBS PTM Configuration" message. The "5G MBS PTM Configuration" may indicate the active 5G MBS sessions or bearers and the scheduling information for each session or bearer (e.g. scheduling period, scheduling window and start offset).

Figure 10:
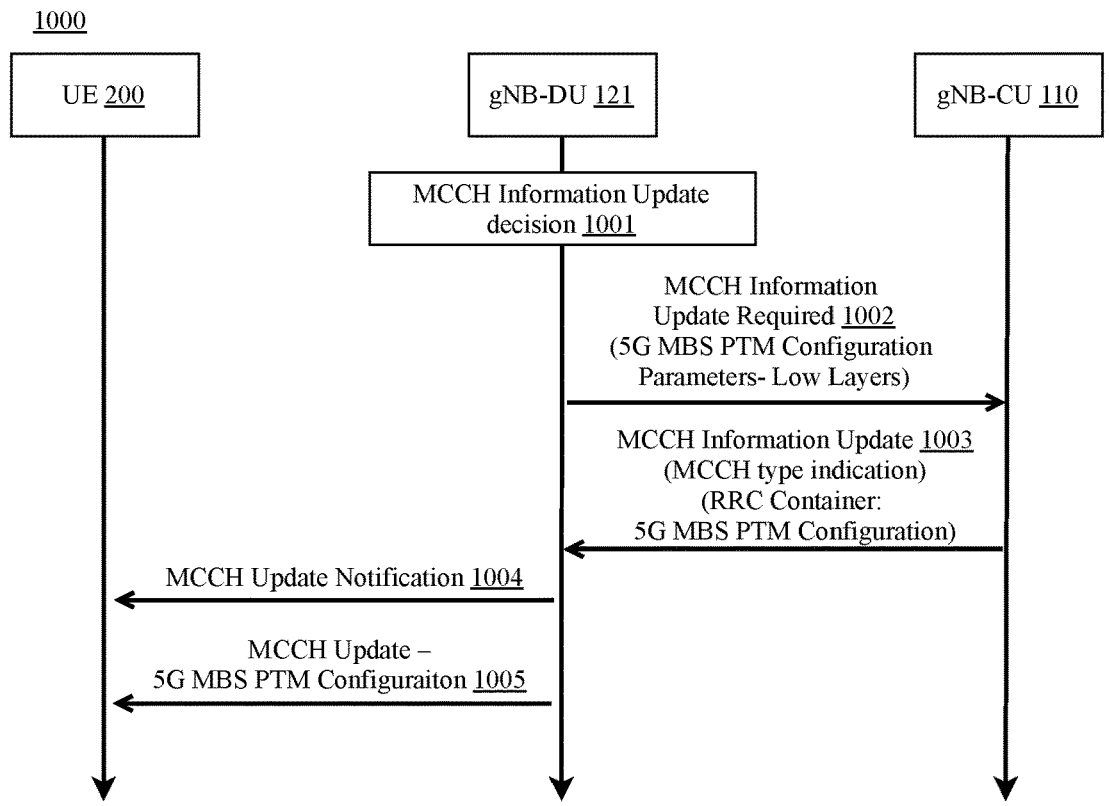
FIG. 10 is a flowchart of a method for signaling MBS configuration according to some embodiments of the present disclosure.

FIG. 10 is a flowchart of a method 1000 for signaling MBS configuration according to some embodiments of the present disclosure. Referring FIG. 10, the gNB-DU 121 may determine or decide to update the MCCH Information. In operation 1001, the gNB-DU 121 may make a MCCH information decision to update the information carried on the MCCH.

In operation 1002, the gNB-DU 121 may transmit a "MCCH Information Update Required" message to the gNB-CU 100. The "MCCH Information Update Required" message may include parameters of a 5G MBS PTM Configuration, for example, the parameters of lower layers.

Upon receipt of the "MCCH Information Update Required" message from the gNB-DU 121, the gNB-CU 110 may transmit a corresponding response to the gNB-DU 121.

In operation 1003, the gNB-CU 110 may transmit a RRC container to the gNB-DU 121, in which the RRC container includes the corresponding 5G MBS PTM Configuration. In operation 1003, in addition to the RRC container, the gNB-CU 110 may also transmit the "MCCH type indication" to the gNB-DU 121. The MCCH type indication may indicate which MCCH may carry the 5G MBS PTM configuration in the RRC container or indicate which MCCH may be updated. In some embodiments, the "MCCH type indication" may be implicitly indicated by the F1-AP message name.

Upon receipt the RRC container and MCCH type indication from the gNB-CU 110, the gNB-DU 121 may update or change the information carried on the MCCH according to the parameters of the MCCH Configuration. In operation 1004, the gNB-DU 121 may transmit a MCCH Update notification to the UE 200. In some embodiments, the gNB-DU 121 may broadcast a MCCH Update notification to the UE 200 according to the parameters of the MCCH Configuration. In operation 1005, the gNB-DU 121 update the information on the MCCH with the 5G MBS PTM configuration transmitted from the gNB-CU 110.

In the scheme shown in FIG. 10, the gNB-DU 121 may determine or decide whether the MCCH Information is going to be updated or changed. The gNB-DU 121 may transmit a "MCCH Information Update Required" to the gNB-CU 110. The gNB-CU 110 may transmit a RRC container (including 5G MBS PTM Configuration) and a MCCH type indication to gNB-DU 121. The gNB-DU 121 may transmit (or broadcast) a MCCH Update notification to UE 200 and update the information on the MCCH according to the parameters of the MCCH Configuration. The scheme disclosed in FIG. 10 may be provided in RRC_IDLE or RRC_INACTIVE states.

Figure 11:
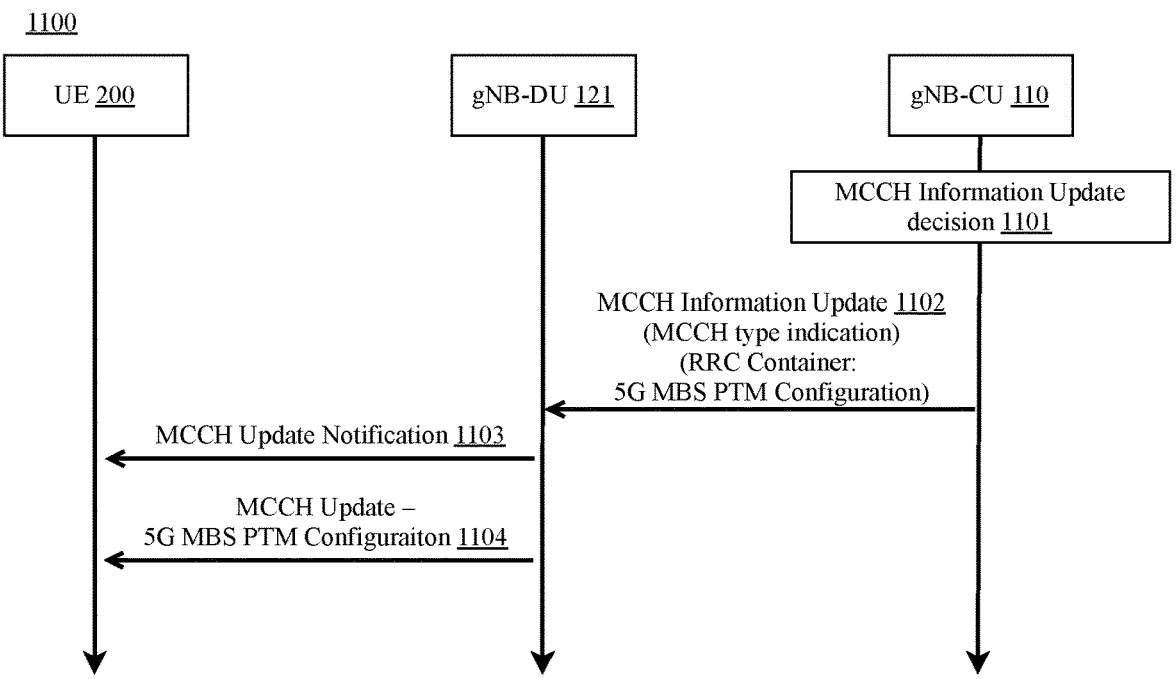
FIG. 11 is a flowchart of a method for signaling MBS configuration according to some embodiments of the present disclosure.

FIG. 11 is a flowchart of a method 1100 for signaling MBS configuration according to some embodiments of the present disclosure. Referring to FIG. 11, the gNB-CU 110 may determine or decide to update the MCCH Information. In operation 1101, the gNB-CU 110 may make a MCCH information decision to update the information carried on the MCCH.

The gNB-CU 110 may transmit corresponding messages to the gNB-DU 121. In operation 1102, the gNB-CU 110 may transmit a RRC container to the gNB-DU 121, in which the RRC container may include the corresponding 5G MBS PTM Configuration. In operation 1003, in addition to the RRC container, the gNB-CU 110 may also transmit the "MCCH type indication" to the gNB-DU 121. The MCCH type indication may indicate which MCCH may carry the 5G MBS PTM configuration in the RRC container or indicate which MCCH may be updated.

Upon receipt of the RRC container and MCCH type indication from the gNB-CU 110, the gNB-DU 121 may update or change the information carried on the MCCH according to the parameters of the MCCH Configuration. In operation 1103, the gNB-DU 121 may transmit a MCCH Update notification to the UE 200. In some embodiments, the gNB-DU 121 may broadcast a MCCH Update notification to the UE 200 according to the parameters of the MCCH Configuration. In operation 1104, the gNB-DU 121 updates the information on the MCCH with the 5G MBS PTM configuration transmitted from the gNB-CU 110.

In the scheme shown in FIG. 11 the gNB-CU 110 may determine or decide whether the MCCH Information is going to be updated or changed. The gNB-CU 110 may transmit a RRC container (including 5G MBS PTM Configuration) and a MCCH type indication to gNB-DU 121. The gNB-DU 121 may transmit (or broadcast) a MCCH Update notification to UE 200 and update the information on the MCCH according to the parameters of the MCCH Configuration. The scheme disclosed in FIG. 10 may be provided at RRC_IDLE state or RRC_INACTIVE state.

Figure 12:
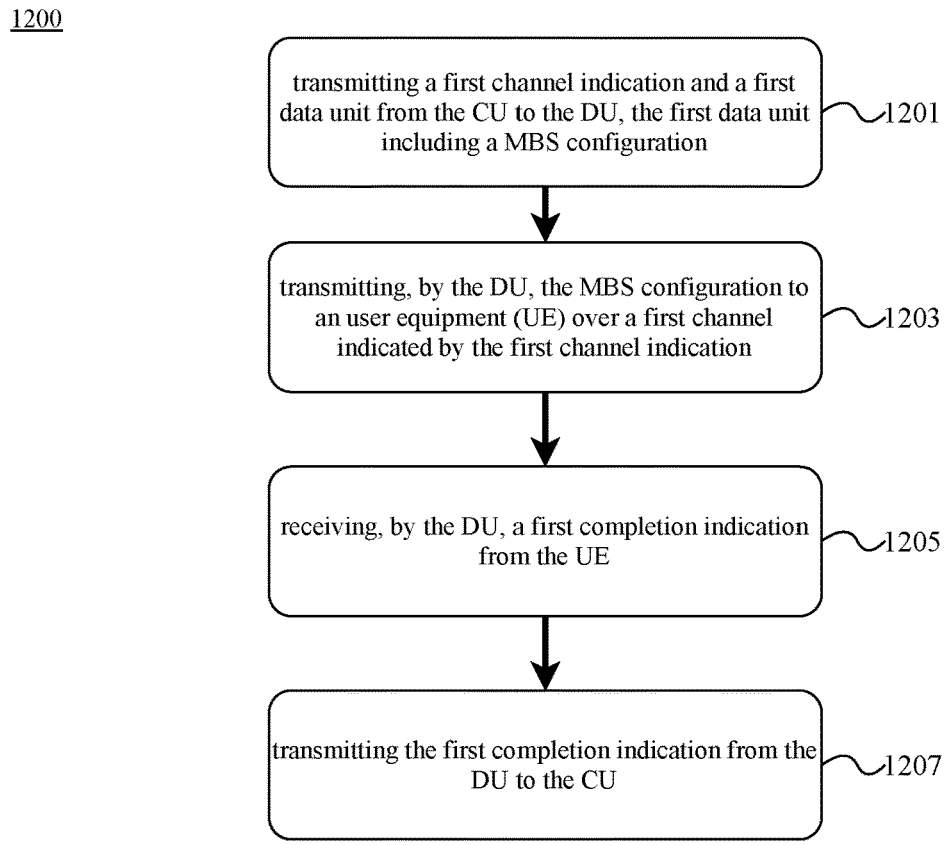
FIG. 12 is a flowchart of a method for gNB according to some embodiments of the present disclosure.

FIG. 12 is a flowchart of a method 1200 according to some embodiments of the present disclosure. The method 1200 may be performed by a NodeB. The NodeB may include a central unit (CU) and a distributed unit (DU). In some embodiments, the NodeB may be the gNB 100; the CU may be the gNB-CU 110; and the DU may be the gNB-DU 121 or 123.

In the exemplary method shown in FIG. 12, operation 1201 the NodeB may transmit a first channel indication and a first data unit from the CU to the DU. The first data unit may include a MBS configuration. The first channel indication may be indicative of a new type of SRB (e.g., SRBx), a MCCH, or a dedicated logical channel. The first data unit may be a radio resource control (RRC). The first data unit may be a RRC container information entity (IE) and the corresponding content, e.g., RRC container (RRCReconfiguration for SRBx).

In operation 1203, the MBS configuration may be transmitted by the DU to user equipment (UE) over a first channel indicated by the first channel indication. In operation 1203, the first data unit (e.g., a RRC or a RRC container IE) may be transmitted by the DU to the UE over a first channel indicated by the first channel indication. In operation 1205, a first completion indication from the UE may be received by the DU. In operation 1207, the first completion indication may be transmitted from the DU to the CU. In operation 1207, the first completion indication may be forwarded from the DU to the CU since the DU may not access the content of the RRC container.

In some embodiments of the method 1200, the first channel indication and the first data unit may be transmitted by a F1-Application Protocol (AP) signaling. The F1-AP signaling may be associated with the UE.

In some embodiments, the method 1200 may further comprise transmitting a service setup indication from the CU to the DU and transmitting a service setup response from the DU to the CU. The service setup response may include a first configuration of lower layers associated with the MBS configuration.

In some embodiments of the method 1200, the first channel indication may include a logical channel type indication. The logical channel indication may indicate a multicast control channel. The first channel may include a multicast control channel. The first completion indication may be received over the multicast control channel.

In some embodiments of the method 1200, the method 1200 may further comprise transmitting a channel setup indication from the CU to the DU and transmitting a second configuration of lower layers from the DU to the CU. In other embodiments, the method 1200 may further comprise transmitting a second channel indication and a second data unit from the CU to the DU, the second data unit including a channel configuration for the first channel, transmitting, by the DU, the channel configuration for the first channel (or the second data unit) to the UE over a second channel indicated by the second channel indication, receiving, by the DU, a second completion indication from the UE over the second channel, and transmitting the second completion indication from the DU to the CU. The second data unit may comprise an RRC container. The first channel indication may include a signaling radio bearer type indication. The first channel may include a first signaling radio bearer. The second channel may include a second signaling radio bearer. The first signaling radio bearer may be a signaling radio bearer for transmitting the MBS configuration. The first signaling radio bearer may be a new signaling radio bearer.

In some embodiments of the method 1200, the method 1200 may further comprise transmitting a channel setup indication from the CU to the DU and transmitting a second configuration of lower layers from the DU to the CU. In other embodiments, the method 1200 may further comprise transmitting a second channel indication and a second data unit from the CU to the DU, the second data unit including a channel configuration for the first channel, transmitting, by the DU, the channel configuration for the first channel to the UE over a second channel indicated by the second channel indication, receiving, by the DU, a second completion indication from the UE over the second channel, and transmitting the second completion indication from the DU to the CU. The first channel indication may include a logical channel identifier. The first channel may include a first logical channel. The second channel may include a second signaling radio bearer or a second logical channel. The second configuration of lower layers may include the logical channel identifier. The logical channel identifier may be allocated by the DU. The logical channel identifier may be transmitted to CU in a F1-AP message.

Figure 13:
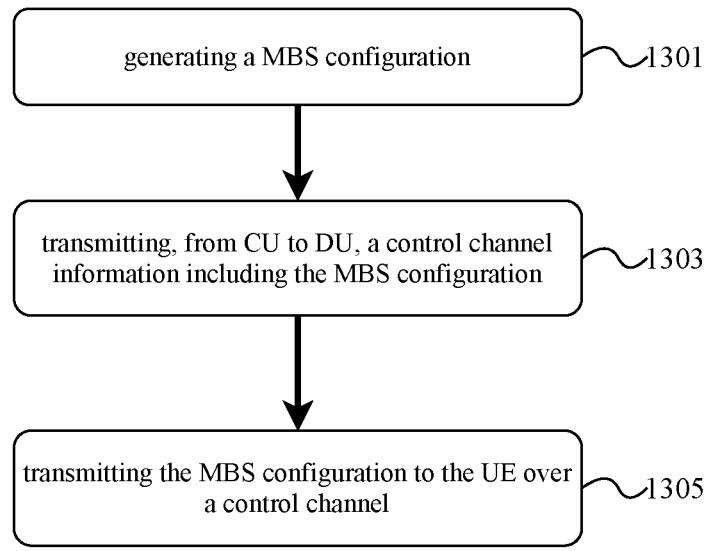
FIG. 13 is a flowchart of a method for gNB according to some embodiments of the present disclosure.

FIG. 13 is a flowchart of a method 1300 according to some embodiments of the present disclosure. The method 1300 may be performed by a NodeB. The NodeB may include a central unit (CU) and a distributed unit (DU). In some embodiments, the NodeB may be the gNB 100; the CU may be the gNB-CU 110; and the DU may be the gNB-DU 121 or 123.

In the exemplary method shown in FIG. 13, operation 1301 the NodeB may generate a service MBS configuration. In operation 1303, control channel information may be transmitted from the CU to the DU. The control channel information may include the MBS configuration. In operation 1305, the MBS configuration may be transmitted to user equipment (UE) over a control channel. The MBS configuration may be included in an RRC container.

In some embodiments of the method 1300, the method 1300 may further comprise the DU transmitting an updated notification in response to the control channel information including the MBS configuration.

In some embodiments of the method 1300, the CU may determine or decide the control channel information.

In some embodiments of the method 1300, the DU may determine or decide to set (e.g. setup or update) the control channel information. The DU may transmit a request for setup (or update) of the control channel. The DU may transmit the request to the CU. The request may include one or more parameters of lower layers associated with the MBS configuration.

In some embodiments of the method 1300, the method 1300 may further comprise generating a system information block by the CU, the system information block including a control channel configuration of the control channel, transmitting the system information block from the CU to the DU, and transmitting, by the DU, the system information block to the UE. In some embodiments, the system information block (SIB) may be encapsulated in a RRC container. The SIB encapsulated in a RRC container may not be accessed by the DU.

In some embodiments of the method 1300, the control channel configuration may be determined by the CU. The method 1300 may further comprise transmitting the control channel configuration from the CU to the DU and the DU transmitting the MBS configuration to the UE using the control channel configuration.

In some embodiments of the method 1300, the control channel configuration is determined by the DU. The method 1300 may further comprise transmitting the control channel configuration from the DU to the CU.

Figure 14:
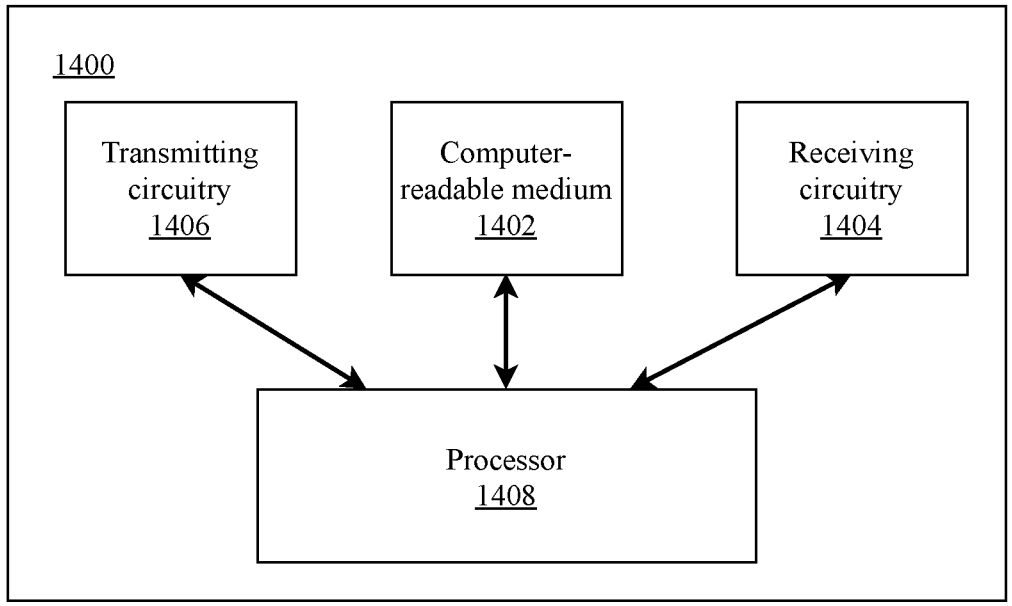
FIG. 14 is a flowchart of a method for gNB according to some embodiments of the present disclosure.

FIG. 14 is a simplified block diagram of an apparatus 1400 according to some embodiments of the present disclosure. The apparatus 1400 may be the gNB 100.

Referring to FIG. 14, the apparatus 1400 may include at least one non-transitory computer-readable medium 1402, at least one receiving circuitry 1404, at least one transmitting circuitry 1406, and at least one processor 1408. Some embodiments of the present disclosure comprise at least one receiving circuitry 1404 and at least one transmitting circuitry 1406 and are integrated into at least one transceiver. The at least one non-transitory computer-readable medium 1402 may have computer executable instructions stored therein. The at least one processor 1408 may be coupled to the at least one non-transitory computer-readable medium 1402, the at least one receiving circuitry 1304 and the at least one transmitting circuitry 1406. The computer executable instructions can be programmed to implement a method with the at least one receiving circuitry 1404, the at least one transmitting circuitry 1406 and the at least one processor 1408. The method can be a method according to an embodiment of the present disclosure, for example, one of the methods shown in FIGS. 3, 5, 6, and 8-13.

Some embodiments of the present disclosure may be disclosed below:

Embodiment 1: A method performed by a NodeB, the NodeB including a central unit (CU) and a distributed unit (DU), the method comprising:
  transmitting a first channel indication and a first data unit from the CU to the DU, the first data unit including a MBS configuration;
  transmitting, by the DU, the MBS configuration to an user equipment (UE) over a first channel indicated by the first channel indication;
  receiving, by the DU, a first completion indication from the UE; and transmitting the first completion indication from the DU to the CU.

Embodiment 2: The method of Embodiment 1, wherein the first data unit comprises a radio resource control (RRC) container.

Embodiment 3: The method of Embodiment 2, wherein the first channel indication and the first data unit are transmitted by a F1-Application Protocol (AP) signaling, and the F1-AP signaling is associated with the UE.

Embodiment 4: The method of Embodiment 1, further comprising:
  transmitting a service setup indication from the CU to the DU; and transmitting a service setup response from the DU to the CU.

Embodiment 5: The method of Embodiment 4, wherein the service setup response includes a first configuration of lower layers associated with the MBS configuration.

Embodiment 6: The method of Embodiment 1, wherein: the first channel indication includes a logical channel type indication.

Embodiment 7: The method of Embodiment 6, wherein: the logical channel type indication indicates a multicast control channel; the first channel includes a multicast control channel; and the first completion indication is received over the multicast control channel.

Embodiment 8: The method of Embodiment 1, the method further comprising:

transmitting a channel setup indication from the CU to the DU; and transmitting a second configuration of lower layers from the DU to the CU.

Embodiment 9: The method of Embodiment 8, further comprises:

transmitting a second channel indication and a second data unit from the CU to the DU, the second data unit including a channel configuration for the first channel;

transmitting, by the DU, the channel configuration for the first channel to the UE over a second channel indicated by the second channel indication;

receiving, by the DU, a second completion indication from the UE over the second channel; and transmitting, the second completion indication from the DU to the CU.

Embodiment 10: The method of Embodiment 9, wherein the second data unit comprises an RRC container.

Embodiment 11: The method of Embodiment 9, wherein:

the first channel indication includes a signaling radio bearer type indication;

the first channel includes a first signaling radio bearer; and the second channel includes a second signaling radio bearer.

Embodiment 12: the method of Embodiment 11 wherein:

the first signaling radio bearer is a signaling radio bearer for transmitting the MBS configuration.

Embodiment 13: The method of Embodiment 9, wherein:

the first channel indication includes a logical channel identifier;

the first channel includes a first logical channel the second channel includes a second signaling radio bearer or a second logical channel; and the second configuration of lower layers includes the logical channel identifier.

Embodiment 14: The method of Embodiment 13, wherein:

the logical channel identifier is allocated by the DU;

the logical channel identifier is transmitted to CU in a F1-AP message.

Embodiment 15: A method performed by a NodeB, the NodeB including a central unit (CU) and a distributed unit (DU), the method comprising:

generating a MBS configuration;

transmitting, from the CU to the DU, a control channel information including the MBS configuration; and transmitting the MBS configuration to an user equipment (UE) over a control channel.

Embodiment 16: The method of Embodiment 15, further comprising the DU transmitting an updated notification in response to the control channel information including the MBS configuration.

Embodiment 17: The method of Embodiment 15, wherein:

the CU decides the control channel information.

Embodiment 18: The method of Embodiment 15, wherein:

the DU decides to set the control channel information; and the DU transmits a request of setting the control channel information to the CU.

Embodiment 19: The method of Embodiment 18, wherein the request of setting the control channel information includes one or more parameters of lower layers associated with the MBS configuration.

Embodiment 20: The method of Embodiment 15, wherein the MBS configuration is included in an RRC container.

Embodiment 21: The method of Embodiment 15, the method comprising:

generating a system information block by the CU, the system information block including a control channel configuration of the control channel;

transmitting the system information block from the CU to the DU; and transmitting, by the DU, the system information block to the UE.

Embodiment 22: The method of Embodiment 21, wherein the control channel configuration is determined by the CU, and the method further comprising:

transmitting the control channel configuration from the CU to the DU; and the DU transmitting the MBS configuration to the UE by using the control channel configuration.

Embodiment 23: The method of Embodiment 21, wherein the control channel configuration is determined by the DU, and the method further comprises:

transmitting the control channel configuration from the DU to the CU.

Embodiment 24: The method of Embodiment 21, wherein the system information block is included in an RRC container.

Embodiment 25: An apparatus, comprising:

at least one non-transitory computer-readable medium having computer executable instructions stored therein;

at least one receiver;

at least one transmitter; and at least one processor coupled to the at least one non-transitory computer-readable medium, the at least one receiver and the at least one transmitter;

wherein the computer executable instructions are programmed to implement a method according to any one of Embodiments 1-24 with the at least one receiver, the at least one transmitter and the at least one processor.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method performed by a NodeB, the NodeB including a central unit (CU) and a distributed unit (DU), the method comprising:
    transmitting a first channel indication and a first data unit from the CU to the DU, the first data unit including a multicast broadcast services (MBS) configuration;
    transmitting, by the DU, the MBS configuration to a user equipment (UE) over a first channel indicated by the first channel indication;
    receiving, by the DU, a first completion indication from the UE;
    transmitting the first completion indication from the DU to the CU;
    transmitting a channel setup indication from the CU to the DU; and
    transmitting a second MBS configuration of lower layers from the DU to the CU.

2. The method of claim 1, wherein the first data unit comprises a radio resource control (RRC) container.

3. The method of claim 2, wherein the first channel indication and the first data unit are transmitted by a F1-Application Protocol (AP) signaling, and the F1-AP signaling is associated with the UE.

4. The method of claim 1, further comprising:
    transmitting a service setup indication from the CU to the DU; and
    transmitting a service setup response from the DU to the CU.

5. The method of claim 4, wherein the service setup response includes a first configuration of lower layers associated with the MBS configuration.

6. The method of claim 1, wherein the first channel indication includes a logical channel type indication.

7. The method of claim 6, wherein:
    the logical channel type indication indicates a multicast control channel;
    the first channel includes the multicast control channel; and
    the first completion indication is received over the multicast control channel.

8. The method of claim 1, further comprises comprising:
    transmitting a second channel indication and a second data unit from the CU to the DU, the second data unit including a channel configuration for the first channel;
    transmitting, by the DU, the channel configuration for the first channel to the UE over a second channel indicated by the second channel indication;
    receiving, by the DU, a second completion indication from the UE over the second channel; and
    transmitting, the second completion indication from the DU to the CU.

9. The method of claim 8, wherein:
    the first channel indication includes a logical channel identifier;
    the first channel includes a first logical channel;
    the second channel includes a second signaling radio bearer or a second logical channel; and
    the second configuration of the lower layers includes the logical channel identifier.

10. A NodeB for wireless communication, comprising:
    a central unit (CU) and a distributed unit (DU);
    at least one memory; and
    at least one processor coupled with the at least one memory and configured to cause the NodeB to:
        transmit a first channel indication and a first data unit from the CU to the DU, the first data unit including a multicast broadcast services (MBS) configuration;
        transmit, by the DU, the MBS configuration to a user equipment (UE) over a first channel indicated by the first channel indication;
        receive, by the DU, a first completion indication from the UE;
        transmit the first completion indication from the DU to the CU;
        transmit a channel setup indication from the CU to the DU; and
        transmit a second MBS configuration of lower layers from the DU to the CU.

11. The NodeB of claim 10, wherein the first data unit includes a radio resource control (RRC) container.

12. The NodeB of claim 11, wherein the at least one processor is configured to cause the NodeB to transmit the first channel indication and the first data unit by a F1-application protocol (AP) signaling that is associated with the UE.

13. The NodeB of claim 10, wherein the at least one processor is configured to cause the NodeB to:
    transmit a service setup indication from the CU to the DU; and
    transmit a service setup response from the DU to the CU, the service setup response including a first configuration of lower layers associated with the MBS configuration.

14. The NodeB of claim 10, wherein:
    the first channel indication includes a logical channel type indication of a multicast control channel;
    the first channel includes the multicast control channel; and
    the first completion indication is received over the multicast control channel.

15. The NodeB of claim 10, wherein the at least one processor is configured to cause the NodeB to:

transmit a second channel indication and a second data unit from the CU to the DU, the second data unit including a channel configuration for the first channel;

transmit, by the DU, the channel configuration for the first channel to the UE over a second channel indicated by the second channel indication;

receive, by the DU, a second completion indication from the UE over the second channel; and transmit, the second completion indication from the DU to the CU.

16. The NodeB of claim 15, wherein:

the first channel indication includes a logical channel identifier;

the first channel includes a first logical channel;

the second channel includes a second signaling radio bearer or a second logical channel; and the second configuration of the lower layers includes the logical channel identifier.

17. A user equipment (UE) for wireless communication, comprising:

at least one memory; and at least one processor coupled with the at least one memory and configured to cause the UE to:

receive, from a distributed unit (DU) of a NodeB (gNB), a multicast broadcast services (MBS) configuration over a first channel, the MBS configuration included in a first data unit transmitted from a central unit (CU) of the gNB to the DU;

transmit, to the gNB, a first configuration completion indication that is transmitted from the DU to the CU;

receive, over a second channel from the DU of the gNB, a channel configuration for the first channel, the channel configuration included in a second data unit transmitted from the CU to the DU; and transmit, to the gNB, a second configuration completion indication that is transmitted from the DU to the CU.

18. A method performed by a user equipment (UE), the method comprising:

receiving, from a distributed unit (DU) of a NodeB (gNB), a multicast broadcast services (MBS) configuration over a first channel, the MBS configuration included in a first data unit transmitted from a central unit (CU) of the gNB to the DU;

transmitting, to the gNB, a first configuration completion indication that is transmitted from the DU to the CU;

receiving, over a second channel from the DU of the gNB, a channel configuration for the first channel, the channel configuration included in a second data unit transmitted from the CU to the DU; and transmitting, to the gNB, a second configuration completion indication that is transmitted from the DU to the CU.

* * * * *